United States Patent
Kawanishi et al.

(10) Patent No.: US 8,005,371 B2
(45) Date of Patent: Aug. 23, 2011

(54) MULTI-WAVELENGTH SIGNAL GENERATION DEVICE AND MULTI-WAVELENGTH LIGHT GENERATION METHOD

(75) Inventors: Tetsuya Kawanishi, Koganei (JP); Masayuki Izutsu, Koganei (JP)

(73) Assignee: National Institute of Information and Communications Technology, Incorporated Administrative Agency

( * ) Notice: Subject to any disclaimer, the term of this patent is extended or adjusted under 35 U.S.C. 154(b) by 772 days.

(21) Appl. No.: 11/658,128

(22) PCT Filed: Jul. 19, 2005

(86) PCT No.: PCT/JP2005/013536
§ 371 (c)(1),
(2), (4) Date: Feb. 14, 2008

(87) PCT Pub. No.: WO2006/009271
PCT Pub. Date: Jan. 26, 2006

(65) Prior Publication Data
US 2009/0041470 A1    Feb. 12, 2009

(30) Foreign Application Priority Data
Jul. 20, 2004    (JP) ................. 2004-211184

(51) Int. Cl.
*H04B 10/00*    (2006.01)
(52) U.S. Cl. ........ 398/188; 398/183; 398/187; 398/199; 398/201
(58) Field of Classification Search ........... 398/182–201
See application file for complete search history.

(56) References Cited

U.S. PATENT DOCUMENTS

| 5,153,933 | A * | 10/1992 | Smith et al. | 385/27 |
| 5,265,112 | A * | 11/1993 | Noll et al. | 372/32 |
| 6,407,846 | B1 * | 6/2002 | Myers et al. | 359/239 |
| 6,591,026 | B2 * | 7/2003 | Endo et al. | 385/15 |

FOREIGN PATENT DOCUMENTS

| EP | 0385697 | 9/1990 |
| EP | 1209780 | 5/2002 |
| EP | 1780594 | 5/2007 |
| JP | 8-122833 | 5/1996 |
| JP | 2001-209082 | 8/2001 |

OTHER PUBLICATIONS

International Search Report for PCT/JP2005/013536 mailed Oct. 25, 2005 (2 pages).
Patent Abstracts of Japan 08-122833 dated May 17, 1996 (2 pages).
Patent Abstracts of Japan 2001-209082 dated Aug. 3, 2001 (2 pages).

(Continued)

*Primary Examiner* — Agustin Bello
(74) *Attorney, Agent, or Firm* — Osha • Liang LLP

(57) ABSTRACT

A multiple wavelength signal generation device of the present invention is a multiple wavelength signal generation device having an optical comb generator for obtaining an input light and a group of lights shifted from the input light by predetermined frequencies; and an optical adjusting portion adjusting lights to be inputted to the optical comb generator; wherein the optical comb generator is composed of an optical fiber loop (105) which is provided with an optical SSB modulator (101), an optical amplifier (102) for compensating a conversion loss at the optical SSB modulator, an optical input port (103) for inputting lights from the light source, and an optical output port (104) for outputting lights, and the optical adjusting portion is composed of a phase modulator, an intensity modulator, or a frequency modulator.

13 Claims, 4 Drawing Sheets

OTHER PUBLICATIONS

T. Kawanishi et al., "SSB Henchoko Loop O Mochiita Optical Comb Hassei to Kahenko Delay Line", The Institute of Electronics, Information and Communication Engineers Gijutsu Kenkyu Hokoku, vol. 104, No. 25, (OCS2004 1-10), Apr. 23, 2004 pp. 13-18 (6 pages).

L. Moller, "Optical Lightwave Synthesizer", Journal of Lightwave Technology, vol. 15, No. 3, (1997) pp. 458 to 465 (8 pages).

English language of the International Preliminary Report on Patentability dated May 3, 2007 for corresponding International Application No. PCT/JP2005/013536, 7 pages.

Examination Report dated May 27, 2008, issued by the European Patent Office in Application No. 05 766 201.7-2205, 11 pages.

Michiyuki Endo et al., "Investigation of single sideband optical frequency comb generations using a dual-electrode Mach-Zehnder modulator in a fiber recirculating loop"; Lasers and Electro-Optics, 1999. Cleo/Pacific Rim 1999, pp. 771-772, XP010364497 ISBM: 0-7803-5561-6, 2 pages.

\* cited by examiner (A)

(B)

(C)

(D)

(E)

US 8,005,371 B2

MULTI-WAVELENGTH SIGNAL GENERATION DEVICE AND MULTI-WAVELENGTH LIGHT GENERATION METHOD

TECHNICAL FIELD

The present invention relates to a multiple wavelength signal generation device and a generation method for multiple wavelength light.

BACKGROUND ART

A multiple wavelength signal generation device can be used as a light source for a wavelength multiplexed transmission system, a reference light source for measurement, and the like. Therefore, various types of multiple wavelength signal generation devices have been proposed. As specific multiple wavelength signal generation devices, one having integrated numerous semiconductor lasers (LD), a super continuum light source utilizing non-linearity of a fiber, a mode-locked laser using a fiber ring, and an optical comb generator using a Fabry-Perot optical modulator are known.

For the mode-locked laser and the Fabry-Perot optical modulator, phase relationships between wavelength contents are determined, and wavelength intervals are accurately constant. However, a multiple wavelength signal generation device using them is required to stabilize an optical path, so that the apparatus becomes complicated. Also, since the super continuum light source uses the mode-locked laser, there is a similar problem as that of the mode-locked laser.

In case an optical comb generator is used as the multiple wavelength signal generation device, phase relationships between wavelength components need not be determined. Accordingly, an optical comb generator using an optical SSB modulator instead of a Fabry-Perot optical modulator has been developed. (see [T. Kawanishi, S. Oikawa, K. Higuma and M. Izutsu, "Electrically Tunable Delay Line Using an Optical Single-Side-Band Modulator" *IEEE Photon. Tech. Lett.*, Vol. 14, No. 10, 1454-1456 (2002)], [Tetsuya Kawanishi, Masayuki Izutsu, "Optical Comb Generation Using a SSB Modulation Optical Loop And Variable Optical Delay Line" Shingaku Giho (Technical Report of IEICE) 2004-04, pp. 13-18 (2004)]).

FIG. 4 shows a basic arrangement of a conventional optical comb generator using an optical SSB modulator (hereinafter, also called simply as "optical comb generator"). As shown in FIG. 4, an optical comb generator (100) is composed of an optical fiber loop (105) provided with an optical SSB modulator (101), an optical amplifier (102) for compensating a conversion loss by the optical SSB modulator, an optical input port (103), and an optical output port (104). It is to be noted that the optical SSB modulator is an optical modulator capable of obtaining an output light having shifted just an amount of a frequency of a modulating signal. Hereinafter, a basic operation of the optical comb generator will be described.

An input light (106) is inputted to the input port (104) of the optical comb generator. The input light is a continuous light ($f_0$) of a single mode. Then, a frequency of the input light is shifted ($f_0+f_m$) by the optical SSB modulator (101). A light component (107) whose frequency has been shifted, circles the loop to be combined with a new light inputted to the input port ($f_0$, $f_0+f_m$). These lights are guided to the optical SSB modulator (101), and frequencies of both components are shifted ($f_0+f_m$, $f_0+2f_m$). By repeating these processes, lights having numerous spectrum components (an optical comb) can be obtained. While phase relationships between wavelength components are unstable, since wavelength intervals are constant with a good accuracy and there is little necessity to stably control an optical path, the optical comb generator has an advantage that a simple apparatus is adequate.

Thus, with an optical comb generator, a plurality of wavelength components is included in a loop. Therefore, in order to prevent a light interference within the loop, a single light unmodulated has been used as the input light.

When a device for a wavelength multiplexed optical transmission system is tested by using multiple wavelength lights generated with such an optical comb generator, the testing has been performed by collectively modulating the multiple wavelength lights and by superimposing signals (for example, FIG. 2 of [L. D. Garrett, A. H. Gnauck, Member, IEEE, F. Forghieri, V. Gusmeroli, and D. Scarano, "16×10 Gb/s WDM Transmission Over 840-km SMF Using Eleven Broad-Band Chirped Fiber Gratings", IEEE PHOTONICS TECHNOLOGY LETTERS, VOL. 11, NO. 4, APRIL 1999]). When the device for the wavelength multiplexed optical transmission system is tested by using such multiple wavelength lights, since the test has been performed by using the lights having the same optical phase or the like, it cannot be deemed that the test is performed appropriately. Also, in FIG. 1 of [Hiro Suzuki, Jun-Ichi Kani, Hiroji Masuda, Noboru Takachio, Katsumi Iwatsuki, Yasuhiko Tada, and Masatoyo Sumida, "1-Tb/s (100 10 Gb/s) Super-Dense WDM Transmission with 25-GHz Channel Spacing in the Zero-Dispersion Region Employing Distributed Raman Amplification Technology" IEEE PHOTONICS TECHNOLOGY LETTERS, VOL. 12, NO. 7, JULY 2000], after having bundled even numbers and odd numbers of wavelength components, intensities are modulated by using signals having time differences, thereby performing an experiment related to the wavelength multiplexed system using such lights. Also in this example, while modulation patterns are different between adjacent channels, the same patterns appear after every other channel. Therefore, as in the above example, it cannot be deemed that a test is performed appropriately. Therefore, a multiple wavelength signal source including more modulations with a simple apparatus have been desired.

DISCLOSURE OF THE INVENTION

It is an object of the present invention to provide a multiple wavelength signal generation device capable of generating lights having more information by using the above-mentioned conventional optical comb generator, and a generation method for multiple wavelength light using such a light source.

It is another object of the present invention to provide a multiple wavelength light source having different information per wavelength component. It is another object of the present invention to provide a multiple wavelength light source having different kinds of information per wavelength component, and being used for testing a device for a wavelength multiplexed communication system.

The inventors of the present invention have reached completion of the present invention based on knowledge that a light interference within an optical comb generator can be suppressed even when information of a phase modulation, an intensity modulation, or a frequency modulation is held by the input light, and in addition, more information can be transmitted compared to the past. Namely, the above-mentioned problems can be solved by the following inventions:

[1] In order to achieve at lease one of the above-mentioned objects, a multiple wavelength signal generation device of the present invention is a multiple wavelength signal generation device having an optical comb generator for obtaining an input light and a group of lights shifted from the input light by predetermined frequencies; and an optical adjusting portion adjusting lights to be inputted to the optical comb generator; wherein the optical comb generator is composed of an optical fiber loop (105) which is provided with: an optical SSB modulator (101), an optical amplifier (102) for compensating the conversion loss in the optical SSB modulator, an optical input port (103) for inputting lights from the light source, and an optical output port (104) for outputting lights, and the optical adjusting portion is provided with a phase modulator, an intensity modulator, or a frequency modulator.

Only an unmodulated single light has been inputted to the conventional optical comb generator. However, it is found that when a light whose phase, intensity, and frequency are modulated is inputted as in the present invention, more information can be transmitted, an in addition, the lights do no interfere with one another. Namely, according to the present invention, a lot of lights with more information and having different optical frequencies can be obtained compared to a multiple wavelength signal generation device using the conventional optical comb generator.

[2] Another preferred embodiment of the multiple wavelength signal generation device of the present invention is the multiple wavelength signal generation device described in the above [1], wherein the optical adjusting portion is provided with a light source outputting optical signals arranged with periodicity or pseudorandom signals. By using these light sources that output optical signals, a multiple wavelength signal generation device capable of outputting a multiple wavelength light having various kinds of information as an output light can be obtained.

[3] Another preferred embodiment of the multiple wavelength signal generation device of the present invention is the multiple wavelength signal generation device described in the above [1], wherein values of frequencies modulated by the optical SSB modulator are 1 GHz-50 GHz.

[4] Another preferred embodiment of the multiple wavelength signal generation device of the present invention is a wavelength multiplexed optical communication system using the multiple wavelength signal generation device described in the above [1]-[3].

[5] In order to achieve at lease one of the above-mentioned objects, a generation method for a multiple wavelength light is a generation method for a multiple wavelength light obtaining an optical comb that is a collection of lights whose optical frequencies are sequentially shifted by repeating: a step of an optical adjusting portion modulating at least one or more of a phase, an intensity, and a frequency of light; a step of the plurality of lights entering an optical input port (103); a step of the plurality of lights entering an optical SSB modulator (101) through an optical fiber loop (105); a step of the optical SSB modulator outputting an optical single sideband signal having shifted a frequency of the input light by a frequency of a modulating signal; a step of the optical amplifier (102) increasing an optical intensity of the output lights of the optical SSB modulator (101); a step of output lights from the optical amplifier (102) reaching the optical input port (103) through the optical fiber loop (105); and a step of the output lights from the optical amplifier (102) and a light from the optical adjusting portion being combined at the optical input port (103).

[6] A preferred embodiment of the generation method for a multiple wavelength light is a wavelength multiplexed optical communication method using a multiple wavelength light obtained by the method for generating the multiple wavelength light as described in the above [4].

According to the present invention, it is made possible to provide a multiple wavelength signal generation device capable of obtaining multiple wavelength lights that can be utilized for a wavelength multiplexed optical communication system and the like.

According to the present invention, it is made possible to provide a multiple wavelength light source having different information (phase information, intensity information, and the like) per wavelength component. Also, according to the present invention, it is made possible to provide a multiple wavelength light source used for testing a device for a wavelength multiplexed communication system. According to the present invention, an optical comb (multiple wavelength lights) can be formed by modulating each optical component forming the optical comb. The multiple wavelength lights thus obtained have different modulations for the respective lights of the wavelengths, so that it can be used preferably for testing a device used for a wavelength multiplexed system.

BRIEF DESCRIPTION OF THE DRAWINGS

FIG. 2A shows a state where the first light is inputted. FIG. 2B shows a state of an output light of an optical SSB modulator. FIG. 2C shows a state where an SSB modulated light and a new light are combined. FIG. 2D shows a wave combined state of the third round. FIG. 2E is a schematic diagram of an optical comb derived from an input light $f_1$.

BEST MODE OF CARRYING OUT THE INVENTION (1. Specific Example of Multiple Wavelength Signal Generation Device)

Figure 1:
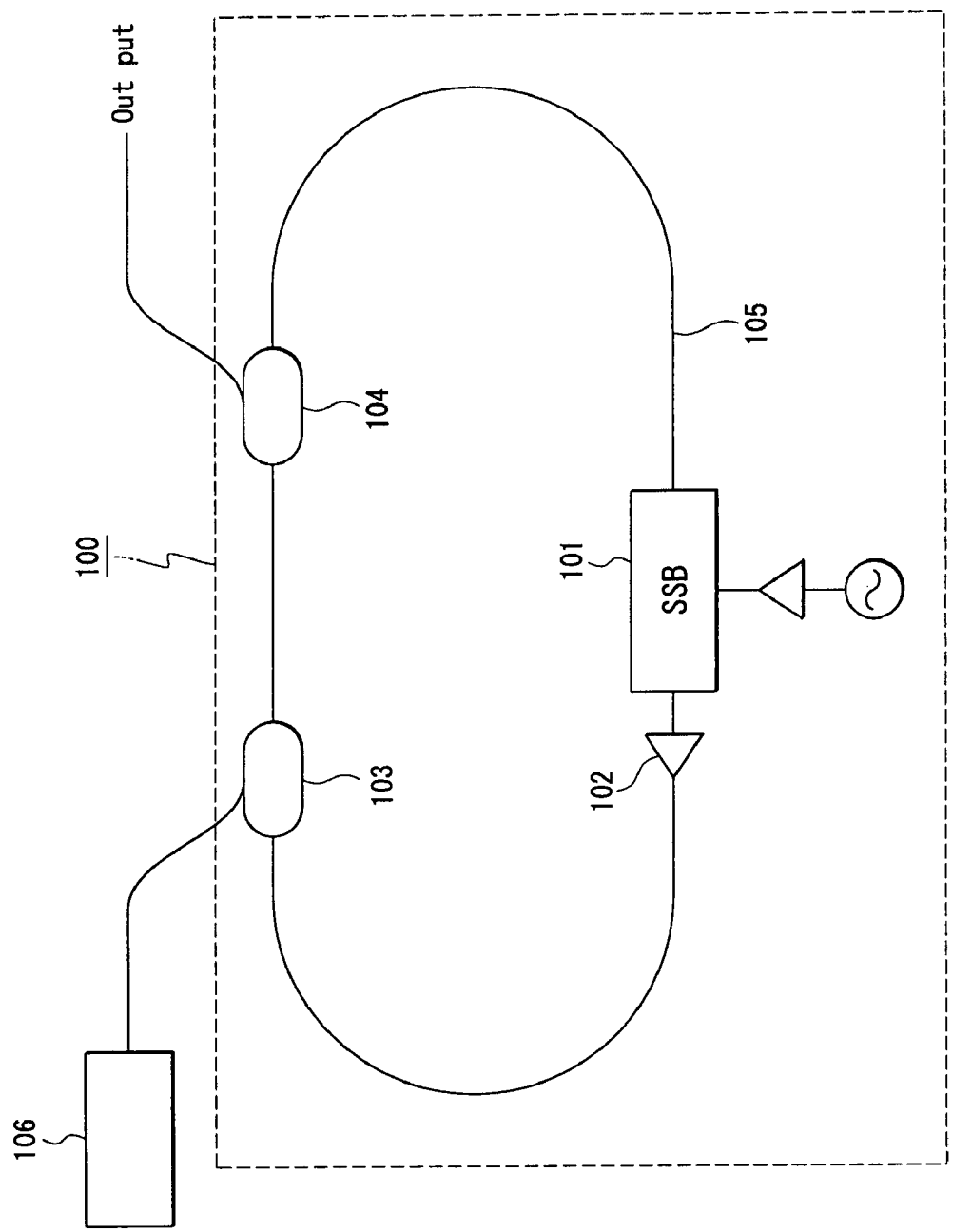
FIG. 1 is a schematic diagram showing a basic arrangement of a multiple wavelength signal generation device of the present invention.

FIG. 1 is a schematic diagram showing a basic arrangement of a multiple wavelength signal generation device of the present invention. As shown in FIG. 1, the multiple wavelength signal generation device of the present invention is provided with an optical comb generator (100) and an optical adjusting portion (106). Hereinafter, components of the multiple wavelength signal generation device of the present invention will be described.

(1.1. Optical Comb Generator)

The optical comb generator (100) is an apparatus for obtaining an input light and a group of lights shifted from the input light by predetermined frequencies. As shown in FIG. 1, the above-mentioned optical comb generator of the present invention is provided with an optical SSB modulator (101), an optical amplifier (102), an optical input port (103), and an optical output port (104). It is to be noted that the operation of the optical comb generator is the same as that described in the prior art.

(1.1.1. Optical SSB Modulator)

An optical SSB modulator is an optical modulator which can obtain an output light having shifted for a frequency of a modulating signal ($f_m$) (see [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguide," IEEE Photon. Tech. Lett., Vol. 13, 364-366 (2001)] and [Shimotsu Shinichi, Masayuki Izutsu, "LiNbO3 optical single-sideband modulator for next-generation communication", Optical Alliance, 2000.7. pp. 27-30]). It is to be noted that the operation of the optical SSB modulator is reported in detail in [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)], [Higuma et al., "X-cut lithium niobium optical SSB modulator", Electron Letter, vol. 37, 515-516 (2001)], and the like.

As values of frequencies to be modulated by the optical SSB modulator, 1 GHz-50 GHz can be mentioned, while specifically, 10 GHz, 12.5 GHz, and 25 GHz can be mentioned.

(1.1.2. Optical Amplifier)

The optical amplifier (102) is an apparatus for compensating a conversion loss by the optical SSB modulator. A publicly known optical amplifier may be used as the optical amplifier. It is preferable that a light attenuated by the optical SSB modulator is restored to its original intensity. Also, the optical amplifier may be installed to increase a light intensity before entry into the optical SSB modulator.

(1.1.3. Optical Input Port/Optical Output Port)

The optical input port (103) is a port for the light from the light source to enter. On the other hand, the optical output port (104) is a port for outputting a light. Publicly known optical ports may be used as the optical input port and the optical output port. Specifically, a publicly known circulator can be used.

(1.2. Optical Adjusting Portion)

The optical adjusting portion is an apparatus for adjusting light inputted to the optical comb generator. The optical adjusting portion of the present invention is provided with a phase modulator, an intensity modulator, or a frequency modulator respectively performing a phase modulation, an intensity modulation, or a frequency modulation. This enables inputting light into the optical comb generator in a state where the information is superimposed in a light, so that output with more information can be obtained. Also, the optical adjusting portion that generates a plurality of lights having different wavelengths is a preferred embodiment of the present invention. Also, it is preferable that the optical adjusting portion is provided with a phase modulator, an intensity modulator, or a frequency modulator respectively performing a phase modulation, an intensity modulation, or a frequency modulation per wavelength for a light inputted to the optical comb generator. By thus modulating the input light itself, information can be superimposed per wavelength, and in addition, a situation where output spectrums are varied by interferences between wavelength components can be prevented. It is to be noted that as a phase modulator, an intensity modulator, or a frequency modulator, a publicly known phase modulator, intensity modulator, or frequency modulator may be used.

For the optical adjusting portion, one provided with a light source, a phase modulator, intensity modulator, or a frequency modulator can be mentioned. A preferred embodiment of a light source is one that outputs pseudorandom signals. For the pseudo random signals, those described in Japanese Patent Application Laid-Open Publication No. 5-45250, Japanese Patent Application Laid-Open Publication No. 7-218353, and Japanese Patent Application Laid-Open Publication No. 2003-50410 may be used. By using the pseudorandom signals, signals having various characteristics can be generated. Therefore, the multiple wavelength signal generation device using the pseudorandom signal as the light source can be preferably used specifically for testing a device used for an optical communication such as a wavelength multiplexed system. Another preferred embodiment of the light source is one that outputs an optical signal arranged with periodicity. For an optical signal arranged with periodicity, a pulse signal can be mentioned.

(2. Optical Wavelength Multiplexed Communication System)

A wavelength multiplexed communication system of the present invention is a system including the above-mentioned multiple wavelength signal generation device of the present invention. Namely, the wavelength multiplexed communication system of the present invention can adopt an arrangement of a publicly known wavelength multiplexed communication system except that the above-mentioned multiple wavelength signal generation device of the present invention is used as the light source.

(3. Millimeter Wave Communication System)

A millimeter wave communication system of the present invention is a system including the above-mentioned multiple wavelength signal generation device of the present invention. Specifically, one that includes the multiple wavelength signal generation device of the present invention, a photodetector (PD), and an antenna can be mentioned. A photodetector (PD) is an apparatus for detecting a light from the multiple wavelength signal generation device to be converted into an electric signal. Also, an antenna is an apparatus for emitting the electric signal converted by the photodetector (PD).

(4. Operation Example)

Figure 2:
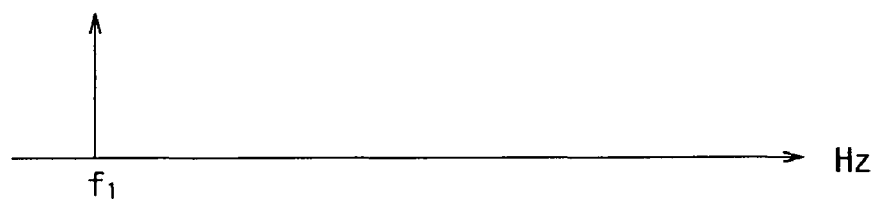
FIG. 2 is a schematic diagram showing a state of light in each process.
Figure 2:
Figure 2:
Figure 2:
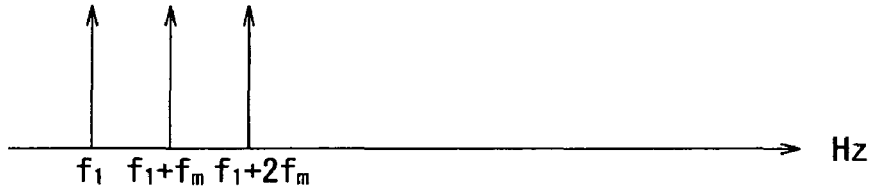
Figure 2:
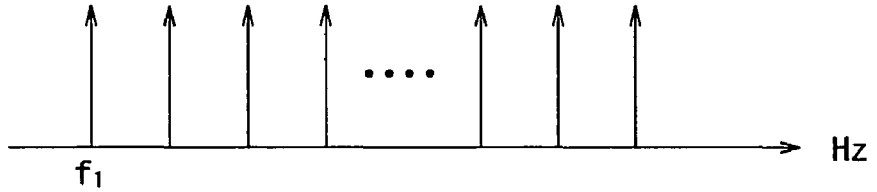

Hereinafter, an operation example of the multiple wavelength signal generation device of the present invention will be described. FIG. 2 is a schematic diagram showing a state of light in each process. FIG. 2A shows a state where the first light is inputted. FIG. 2B shows a state of an output light of an optical SSB modulator. FIG. 2C shows a state where an SSB modulated light and a new light are combined, FIG. 2D shows a wave combined state of the third round. FIG. 2E is a schematic diagram of a light comb derived from the input light. Firstly, the optical adjusting portion adjust at least one or more of a phase, intensity, and a frequency are adjusted. The adjusted light enters the optical input port (103) (FIG. 2A). This light enters the optical SSB modulator (191) through the optical fiber loop (105). Then, the optical SSB modulator outputs optical single sideband signals $(f_1+f_m)$ having shifted from the frequency of the input light by the frequency of the modulating signal (FIG. 2B). The optical amplifier (102) increases the optical intensities of the output lights of the optical SSB modulator to compensate the optical intensities weakened by the optical modulation. It is to be noted that the optical amplifier may be placed before the optical SSB modulator. The output lights from the optical amplifier reach the optical input port (103) through the optical fiber loop (105). The output lights $(f_1+f_m)$ from the optical modulator (102) and the lights $(f_1)$ are combined at the optical input port (103) as $(f_1, f_1+f_m)$ (FIG. 2C). It is to be noted that the input lights $(f_1)$ may be the same as the input light of the first round, or one having differently modulated (types of modulation and size) from the input light of the first round. When these processes are repeated once more, the wavelength multiplexed lights including the third channel $(f_1, f_1+f_m, f_1+f_m+2f_m)$ can be obtained (FIG. 2D). By repeating these processes, an optical comb (FIG. 2E) that is a collection of lights whose optical frequencies are sequentially shifted can be obtained. By using the wavelength multiplexed lights thus obtained, an optical multiplexed communication can be easily performed.

Embodiment 1

Figure 3:
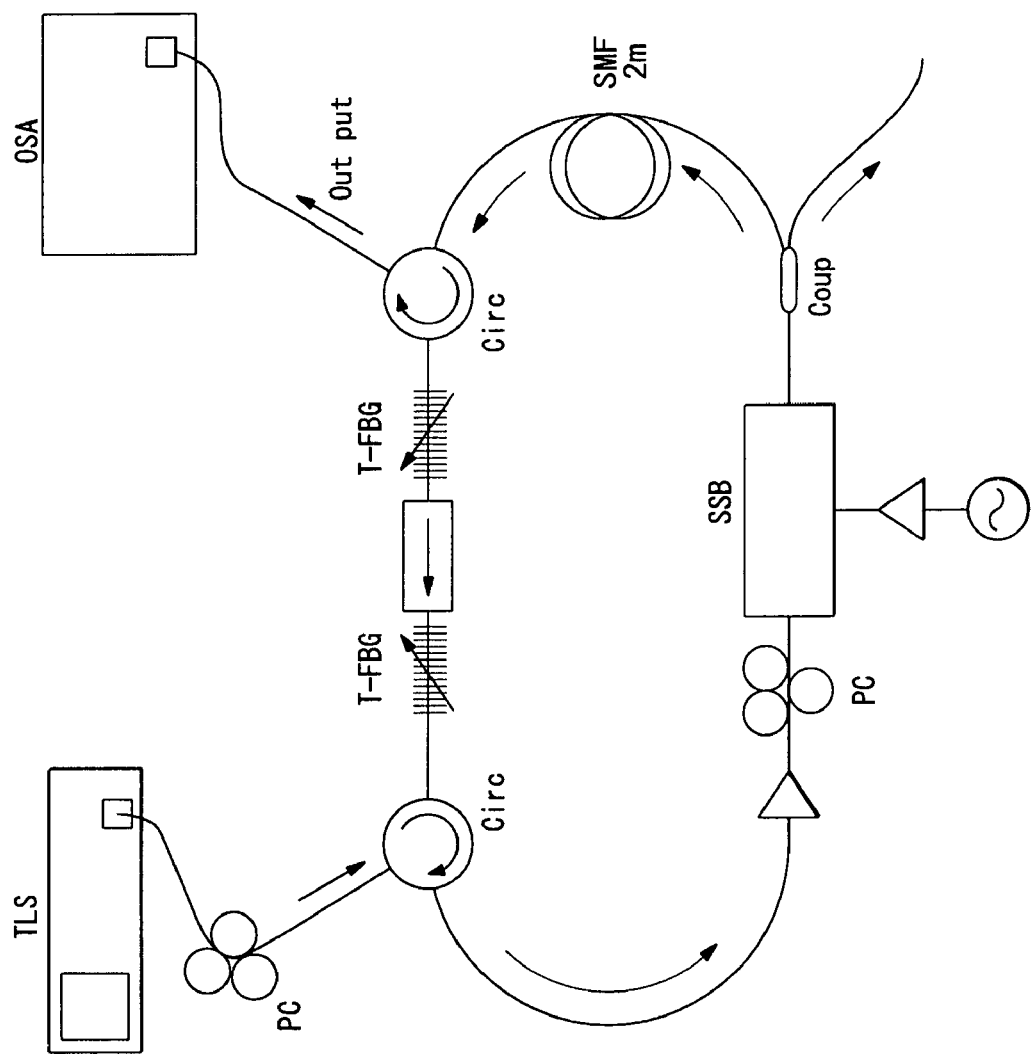
FIG. 3 is a schematic diagram of a multiple wavelength signal generation device used in an embodiment 1.
Figure 4:
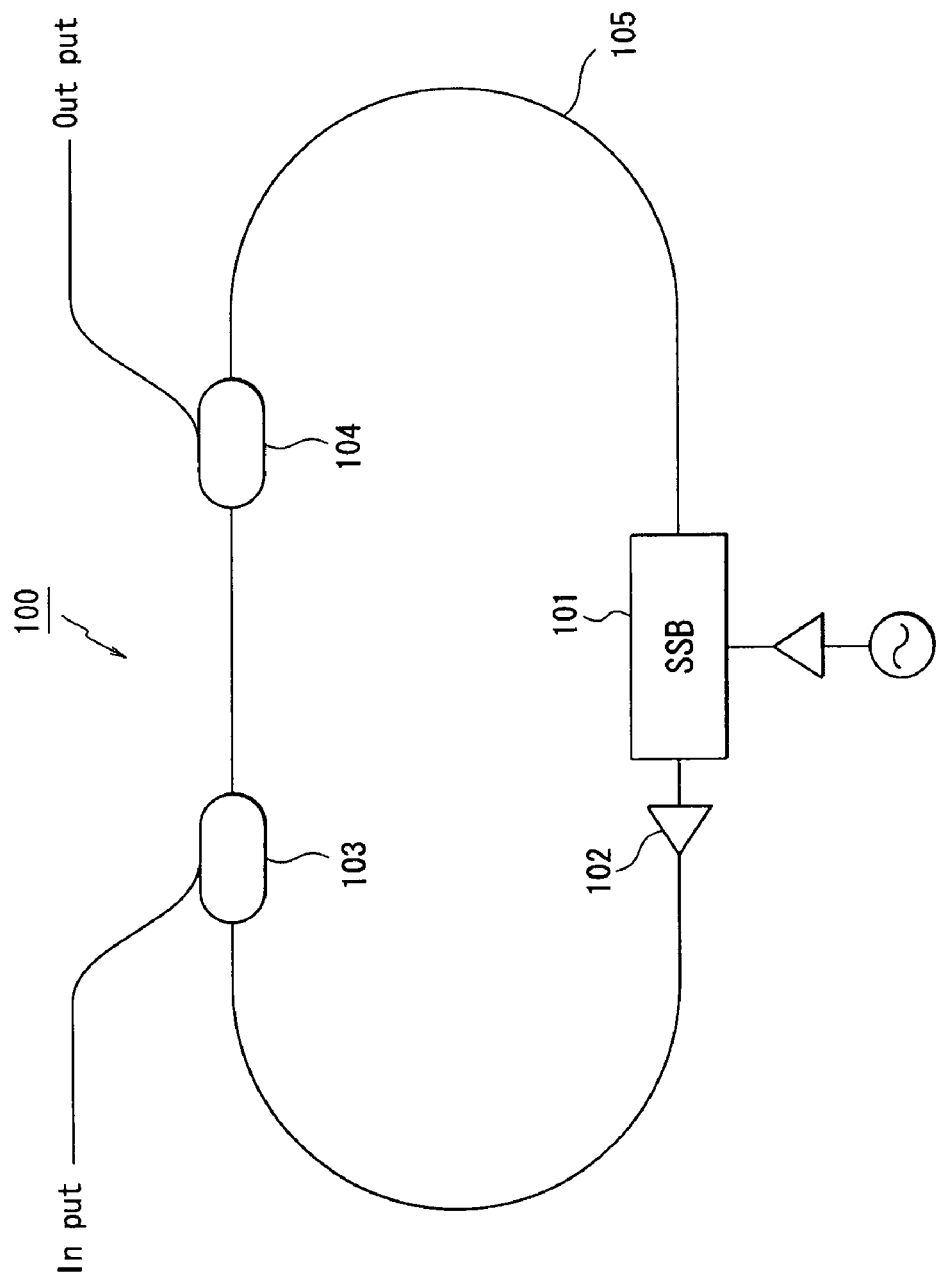
FIG. 4 is a schematic diagram showing a basic arrangement of a conventional optical comb generator.

Hereinafter, the present invention will be specifically described using embodiments. FIG. 3 is a schematic diagram of a multiple wavelength signal generation device used in an embodiment 1. The input lights are lights whose wavelengths are 1550 nm and their respective intensities are 1 mW. Also, the frequency of the electric signal provided to the optical SSB modulator is 10 GHz. An optical amplifier using a fluoride EDF is provided within the loop to compensate a loss of light associated with the wavelength conversion at the optical SSB modulator. The wavelength interval is 0.08 nm for 10 GHz. The multiple wavelength signal generation device shown in FIG. 3 is used to perform more than 120 circles, whereby an optical comb covering a range of approximately 10 nm for the respective input lights. It is to be noted in FIG. 3 that TLS denotes a light source that can be modulated (Tunable Laser Source). PC denotes a Polarization Controller. Circ denotes a Circulator. T-FBG denotes a fiber bragg grating whose reflecting region is variable. SSB denotes an SSB modulator. Coup denotes a Coupler. SMF denotes a single mode fiber. OSA denotes an Optical Spectrum Analyzer.

INDUSTRIAL APPLICABILITY

A multiple wavelength signal generation device of the present invention can be used as a light source for testing an optical amplifier or the like used for a wavelength multiplexed optical communication. Also, the multiple wavelength signal generation device of the present invention can be utilized as a light source of an optical wavelength multiplexed optical communication.

The invention claimed is:

1. A multiple wavelength signal generation device comprising:
    an optical comb generator for obtaining an input light and a group of lights shifted from the input light by predetermined frequencies; and
    an optical adjusting portion adjusting lights to be inputted to the optical comb generator;
    wherein the optical comb generator is composed of an optical fiber loop which comprises:
    an optical SSB modulator,
    an optical amplifier for compensating the conversion loss in the optical SSB modulator,
    an optical input port for inputting lights from the light source, and
    an optical output port for outputting lights, and
    the optical adjusting portion comprises a phase modulator and inputs a plurality of lights having different wavelengths to the optical comb generator, thereby each of the wavelength components in the multiple wavelength signal has phase modulation information.

2. The multiple wavelength signal generation device as claimed in claim 1, wherein the optical adjusting portion comprises a light source outputting optical signals arranged with periodicity or pseudorandom signals.

3. A wavelength multiplexed optical communication system using a multiple wavelength signal generation device as claimed in claim 2.

4. The multiple wavelength signal generation device as claimed in claim 1, wherein values of frequencies modulated by the optical SSB modulator are 1 GHz-50 GHz.

5. A wavelength multiplexed optical communication system using a multiple wavelength signal generation device as claimed in claim 4.

6. A wavelength multiplexed optical communication system using a multiple wavelength signal generation device as claimed in claim 1.

7. The multiple wavelength signal generation device as claimed in claim 1, wherein the phase modulator performs a phase modulation per wavelength for a light inputted to the optical comb generator.

8. The multiple wavelength signal generation device as claimed in claim 1 performing a modulation per optical component composing an optical comb.

9. A generation method for a multiple wavelength light for obtaining an optical comb that is a collection of lights whose optical frequencies are sequentially shifted, the method comprising repetition of:
    a step of an optical adjusting portion modulating a phase of the lights having plurality of wavelengths;
    a step of the plurality of lights modulated by the optical adjusting portion entering an optical input port;
    a step of the plurality of lights entering an optical SSB modulator through an optical fiber loop;
    a step of the optical SSB modulator outputting an optical single sideband signal having shifted a frequency of the input light by a frequency of a modulating signal;
    a step of the optical amplifier increasing an optical intensity of the output lights of the optical SSB modulator;
    a step of output lights from the optical amplifier reaching the optical input port through the optical fiber loop; and
    a step of the output lights from the optical amplifier and a light from the optical adjusting portion being combined at the optical input port, such that each of wavelength components in the multiple wavelength signal has phase modulation information.

10. A wavelength multiplexed optical communication method using a multiple wavelength light obtained by the method for generating the multiple wavelength light as claimed in claim 9.

11. The method as claimed in claim 9, wherein the optical adjusting portion generates a plurality of lights having different wavelengths.

12. The method as claimed in claim 9, wherein the optical adjusting portion comprises a phase modulator, or a frequency modulator respectively performing the phase modulation, or the frequency modulation per wavelength for a light inputted to the optical comb generator.

13. The method as claimed in claim 9 performing a modulation per optical component composing an optical comb.

* * * * *